Figure 1:
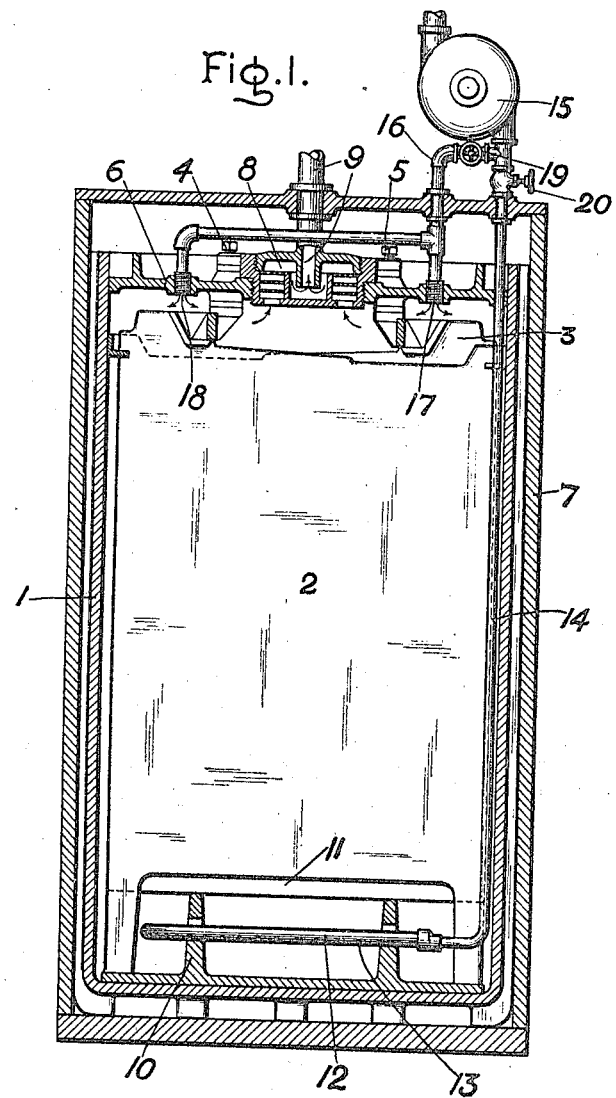

R. N. CHAMBERLAIN.
STORAGE BATTERY.
APPLICATION FILED MAR. 27, 1916.

1,236,673.

Patented Aug. 14, 1917.

Inventor:
Rufus N. Chamberlain
by: Kenyon & Kenyon
His Attorneys.

UNITED STATES PATENT OFFICE.

RUFUS N. CHAMBERLAIN, OF CHICAGO, ILLINOIS, ASSIGNOR TO GOULD STORAGE BATTERY COMPANY, A CORPORATION OF NEW YORK.

STORAGE BATTERY.

1,236,673.

Specification of Letters Patent.

Patented Aug. 14, 1917.

Application filed March 27, 1916. Serial No. 86,906.

*To all whom it may concern:*

Be it known that I, RUFUS N. CHAMBERLAIN, a citizen of the United States, and a resident of Chicago, county of Cook, State of Illinois, have invented certain new and useful Improvements Relating to Storage Batteries, of which the following is a specification.

The invention pertains to improvements relating to storage batteries. As is well known, the ordinary storage battery, at least under certain conditions of charge, gives off oxygen and hydrogen gas and the evolution of such gases is often the cause of serious trouble, such as explosions. This disadvantage has been particularly noticeable in batteries in use on submarine boats. Another disadvantage in the use of storage batteries, particularly in submarine boats, is the high temperature produced by overcharge and also by high rates of charge and discharge of the batteries. Still another problem in this connection is that of getting sufficient or desired capacity from the batteries at high rates of discharge. Another problem is the prevention of the settling of the high density acid in the bottom of a deep tank, such as used in submarine batteries of large capacity, and the equalization of the acid density throughout the deep cell.

The main object of my invention is to provide an arrangement in storage batteries which will aid considerably in overcoming one or more of the above mentioned difficulties.

In carrying out the invention, I provide means for discharging or conveying a cool gas, such as air, into the lower part of the electrolyte of the battery, and preferably substantially below the plates thereof, and as this gas bubbles up through the electrolyte between the plates, it not only more effectively carries off the gases produced therein, but will also exert a cooling effect on the electrolyte and the plates, thus largely preventing the trouble caused at the present by overheating. The inert gas or air flowing upwardly through the electrolyte also produces an extra circulation or stirring of the electrolyte, which promotes the equalization of the density of the electrolyte during charge and discharge, and which enables a more rapid diffusion of electrolyte, and during discharge, enables the plates to receive a supply of sulfuric acid much faster than they otherwise would under normal diffusion conditions. The extra supply of acid at the plates enables a greater amount of active material to come into action, and this increases the capacity obtainable from the plates. On discharge, water is formed in between the molecule of the active material of the plates and coming out into the electrolyte and weakens it at the surface of the plates. Therefore, a circulation of the acid enables a quicker supply of fresh acid to strengthen the weaker acid inside of the plates, thus bringing into action a greater amount of active material and thereby increasing the capacity. Instead of an inert gas such as air, an active gas may be used, which increases the capacity of the battery.

Further objects, features and advantages will more clearly appear from the detailed description given below, taken in connection with the accompanying sheet of drawings, which forms a part of this specification, and in which—

Figure 2:
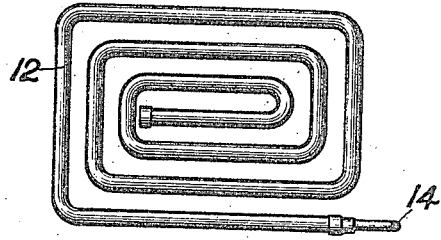

Figure 1 is a section through a storage battery cell, equipped with my improvements in one form, and Fig. 2 is a plan view of the coil located in the bottom part of the cell.

Referring to the drawings, 1 represents a storage battery cell adapted to contain the electrolyte, and negative and positive plates 2 and 3 thereof, which are connected to suitable binding posts 4 and 5 respectively. The cell may be closed by an air-tight cover 6, so as to form an air-tight inclosure for the electrolyte and the plates, and if desired, it may be inclosed in a further air-tight inclosure 7. 8 represents a suitable trap located in the cover 6, into which the gases escape from the electrolyte and top of the cell and are separated from any liquid carried along thereby, the gases being permitted to escape through a pipe 9.

Located below the plates 2 and 3 and supported by a suitable insulating frame 10, the upper portions of which support suitable separators 11, is a tubular coil 12, having small perforations 13, the perforations in the coil being preferably located below the center line thereof. Inert gas, such as air, is supplied to this coil under pressure, by means of a pipe or conduit 14, which extends up along the side of the cell and is connected to a suitable pump 15, by means of which the air is forced down into the pipe 14 into the coil 12 and out through the perforations 13, thence it bubbles up through the electrolyte between the plates to aid in cooling the cell and in providing circulation for the electrolyte, and carrying off the gases generated in the battery and equalizing the acid density. Also connected to be supplied by the pump 15, is a by-pass conduit 16, having terminals which enter the top 6 of the cell, at 17 and 18. In the by-pass 16 is provided a valve 19, so that the rate at which the air may be discharged from the terminals 17 and 18 over the top of the electrolyte in the cell may be regulated as desired. By opening the valve 19, a greater pressure is created at the top of the electrolyte, so that less of the air will flow from the perforated hollow tubular coil 12 at the bottom. If desired, another valve 20 is placed in the pipe 14, leading from the air supply to the coil under the plates to regulate the flow of air through the coil 12. In this way the rate of discharge of the inert gas into the lower part of the electrolyte may be closely regulated, as well as the discharge of inert gas over the top of the electrolyte. Some cells, owing to their location, may require more air for cooling than other cells, and also some cells, having less capacity than others, may require more air to equalize the capacity, and such regulation may be accomplished by operating the valves 19 and 20, as just explained. Sometimes a submarine may have been standing out in a cold harbor so that the battery has become thoroughly chilled, in which case warm instead of cool air may be sent through the circulating system to bring the temperature up to the proper degree.

Instead of placing the pump 15 as shown, where it acts to force the air or inert gas into the pipes 14 and 16, it may be connected to the pipe 9 in a well-known manner, so as to exhaust the gas from the cell, or a combination of both exhaust and compression can be used. That is, it is immaterial whether the pressure, by means of which the inert gases are driven into the cell, is produced by providing a pressure greater than atmospheric pressure, at the intake end, or a pressure less than atmospheric pressure at the exhaust end, or a combination of both. The piping 14 and 16, as well as the coil 12 may be made of suitable insulating material, or if lead pipes are used, rubber insulating connections may be inserted between the piping of the various cells and the lead piping may be covered with suitable rubber covering at points where it is likely to come in contact with the plates.

While I have described my invention in great detail and in connection with one particular embodiment thereof, I do not desire to be limited to such form or details, as it may be embodied in many other forms and many modifications may be made, without departing from the spirit and scope of my invention, especially in its broader aspects, but having fully and clearly described my improvements in one form, what I claim as new and desire to secure by Letters Patent is:

1. A storage battery having in combination with its plates and electrolyte, means for conveying air into the electrolyte to cool the same and promote circulation thereof, said means embracing a perforated tubular coil located wholly beneath the plates and means for supplying air thereto, the perforations in the coil being located below the center line thereof.

2. A storage battery having in combination with its plates and electrolyte means for conveying a gas into the lower part of the electrolyte and also over the top of the electrolyte and a mixing chamber for said gases.

3. A storage battery having in combination with its plates and electrolyte means for conveying a gas into the electrolyte and also over the top of the electrolyte and means whereby the rate of discharge of the gas over the top of the electrolyte may be regulated.

4. A storage battery having in combination with its plates and electrolyte means for conveying a gas into the lower part of the electrolyte and also over the top of the electrolyte and means for regulating the rate at which the gas may be so discharged into the electrolyte and over the top of the electrolyte.

5. A storage battery having in combination with its plates and electrolyte means for conveying a gas into the lower part of the electrolyte and also over the top of the electrolyte, said means embracing a member having located substantially beneath the plates means for conducting the gas thereto, a by-pass conductor for leading the gas to the top of the electrolyte and a valve in the by-pass whereby the discharge of gas at both parts of the battery may be regulated.

6. A storage battery having in combination positive and negative plates, an electrolyte, an air-tight inclosure therefor, means for conveying a gas into the lower part of the electrolyte and also into the upper part of said inclosure in which said gases comingle, means for regulating the flow of said gases into the inclosure, and means for conducting the escaping gases from the top of the inclosure.

In testimony whereof, I have signed my name to this specification.

RUFUS N. CHAMBERLAIN.